May 26, 1959  A. S. KNAPP  2,888,548
THERMOSTAT FOR MULTI-PURPOSE COOKER
Filed March 7, 1955
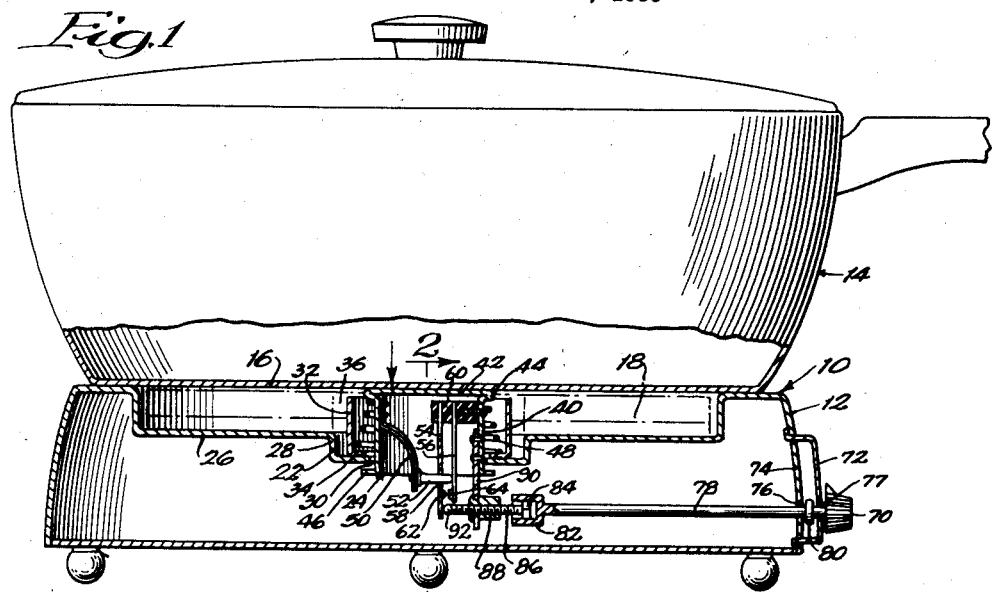
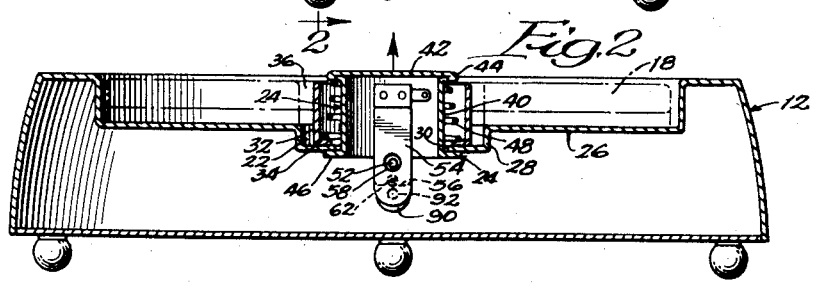
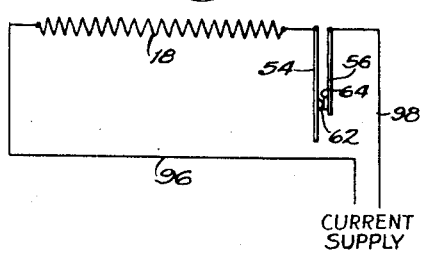
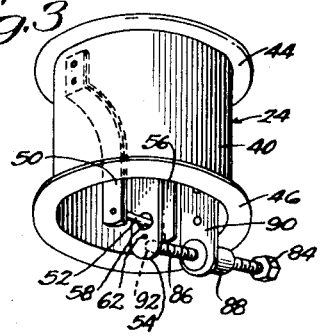
INVENTOR:
Andrew S. Knapp,
BY
Bair, Freeman & Molinare
ATTORNEYS

United States Patent Office 2,888,548
Patented May 26, 1959

2,888,548

THERMOSTAT FOR MULTI-PURPOSE COOKER

Andrew S. Knapp, St. Louis, Mo., assignor to Knapp-Monarch Company, St. Louis, Mo., a corporation of Delaware Application March 7, 1955, Serial No. 492,711

3 Claims. (Cl. 219—43)

This invention relates generally to an electrical cooking appliance, and more particularly to a spring-biased center thermostat adapted to contactingly engage the bottom of a removable cooking container.

There has been a significant trend in recent years toward table-top cooking in the home, and numerous electrical appliances have been provided to permit table-top cooking outside of the kitchen. Modern family living has created a need for simple and efficient cooking means which enable both cooking and serving to be performed in the living area. In order to effect controlled temperature regulation of portable and table-top cooking appliances, numerous thermostatic control devices have been employed. One approach has been to provide a concentric series of separate electrical heating elements which may be selectively energized for providing variable cooking heat. In addition, electrical or gas heating devices have been controlled directly by means of a thermostatic response to the temperature of the heating device. In all instances, the means for temperature control have either been unduly complicated or relatively inaccurate.

The need for better control of the particular food being cooked, rather than mere temperature control of the heating element has become of increasing importance. The extensive growth of the frozen food and pre-cooked food industries has brought about a demand for a simple and efficient means of cooking temperature control which is responsive to the particular temperature and cooking characteristics of the food. Mere temperature control of heating elements or gas flame is insufficient and frequently too slow to properly cook such frozen and pre-prepared foods.

It is a primary object of this invention, therefore, to provide a thermostatic control unit for a portable electrical cooking appliance, which is essentially responsive to the temperature of the food as it is being cooked, for controlling the cooking temperature of the food rather than the heating temperature of the cooking element.

It is another object to provide a spring-biased heat conductor means adapted to contactingly engage the center portion of the bottom of a cooking container, wherein a heat insulating baffle or shield serves to isolate the heat conductor means from the high cooking temperature of the container and the heating temperature of its operatively associated heating element, whereby the heat conductor means will respond essentially to the temperature of the food at a predetermined central area of the container rather than the temperature of the heating element or the peripheral cooking temperature of the container.

It is a further object to provide a thermostatic control device of the type described having regulating means for continuously varying the response position of a pair of electrical contacts which are adapted to be actuated by a deflecting bi-metal element in response to the heat conductor or food temperature-sensing means.

Further objects and advantages of this invention will become apparent as the following description proceeds and the features of novelty which characterize this invention will be pointed out with particularity in the claims annexed to and forming part of this specification.

A preferred embodiment of the invention is shown in the accompanying drawing, in which:

Figure 1 is a side elevational view partly broken away and in cross section illustrating an electrical cooking appliance constructed in accordance with the present invention;

Figure 2 is a cross-sectional view taken substantially as indicated by the line 2—2 on Figure 1, showing the base heating unit with the cooking container removed;

Figure 3 is a perspective view on an enlarged scale showing the heat conductor cup of the thermostatic control unit; and Figure 4 is an electrical wiring diagram showing the control circuit for the appliance.

Referring now to the drawing, I have indicated generally at 10 an electrical cooking appliance constructed in accordance with the present invention. The appliance comprises a base heating unit 12 and a removable cooking container 14 adapted to be disposed in supported relation thereon. The container 14 provides a substantially flat bottom surface 16 adapted to rest upon the top surface of an annular heating means 18. It will be understood that the heating means 18 may comprise an extruded tubular resistance coil assembly integrally cast within a cast iron body, or may be of any suitable type adapted to provide a relatively flat annular form and capable of being regulated by thermostatic control means.

The annular heating means 18 provides a central aperture 20 overlying a recess or well 22 formed by the base unit 12. A thermostatic control unit, indicated generally at 24, is adapted to be disposed within the central aperture 20 and well 22.

The base unit 12 provides an annular supporting surface 26 upon which the annular heating element 18 is mounted. The surface 26 terminates inwardly in a downwardly shouldered portion 28 which serves to define a central aperture 30. The apertures 20 and 30 are aligned one above the other in co-axial relation.

A cylindrical heat baffle wall 32 is mounted by means of an inwardly flanged bottom lip 34 on the supporting surface 26 closely adjacent the central aperture 30 and spaced from the center wall of the annular heating element 18, as indicated at 36. The baffle wall 32 and the air space 36 serves to effectively heat-insulate the thermostatic control unit 24 from the annular heating element 18.

The thermostatic control unit 24 comprises a heat conductor cup 40 of generally hollow cylindrical form. The cup 40 provides a flat top wall 42 terminating at its periphery in an outwardly extending top rim 44, and an outwardly flanged bottom rim 46 at the lower end of the cup side wall. The cup 40 extends upwardly through the central aperture 30 of the base unit supporting surface 26. The bottom rim 46 is disposed below the surface 26 for cooperation with the inner peripheral edge of the central aperture 30 in abutment therewith as a stop means.

A spiral shaped compression spring 48 seats at its lower end upon the bottom lip flange 34 of the heat baffle wall 32, and seats at its upper end against the lower surface of the top rim 44 of the cup 40. The spring 48 serves to normally bias the cup 40 in a vertically upward direction with the top wall 42 in an uppermost position slightly above the planes of the base heating unit top surface and the heating element 18 (see Figure 2). It will be apparent that when the removable cooking container 14 is positioned upon the base unit 12, the top wall 42 of the cup 40 will be maintained in contacting relation against the center of the cooking container bottom at all times by the spring 40.

A bi-metal element 50 is fixedly attached to the inner wall of the cup 40 adjacent its upper end, and extends downwardly therefrom in an arcuately curved form. An actuator stud 52 of suitable insulating material, such as ceramic or the like, is carried by the free lower end of the bi-metal 50. A pair of spring contact blades 54 and 56 are disposed in cooperative relation adjacent the bi-metal 50. The blade 56 nearest the bi-metal 50 is provided with an aperture 58 through which the actuator stud 52 is adapted to freely pass. The blades 54 and 56 are carried in spaced relation to each other by means of an insulator support block 60, which is fixedly attached to the inner side wall of the cup 40 adjacent its upper end. The spring blade 56 is biased toward the blade 54 so as to normally effect contacting engagement of a pair of electrical contacts 62 and 64 carried by the respective blades.

Thermostatic control means are provided for effecting manual regulation of the response position of the contacts 62, 64 relative to the actuator stud 52 carried by the bi-metal 50. A control knob 70 is disposed externally of the base unit 12. A name plate or housing wall 72 is interposed between the knob 70 and a side wall portion 74 of the base unit 12. The side wall 74 and the plate 72 are apertured at 76 and 77 to receive the outer end of an adjusting shaft 78 therethrough for fixed attachment to the knob 70. A locating bushing 80 is carried by the shaft 78 between the plate 72 and the side wall 74 in a manner preventing any substantial longitudinal shifting of the shaft 78 while permitting pivotal movement thereof in a vertical plane.

The inner terminal end 82 of the shaft 78 is forked for grippingly engaging the non-circular head 84 of an adjusting screw 86. In this manner, the screw 86 may be rotated by the shaft 78 while permitting pivotal motion therebetween in a vertical plane.

The screw 86 is received within a threaded bushing 88 which is rigidly carried by a support bar 90 fixedly attached to the inner side wall of the cup 40. The support bar 90 is disposed at a point diametrically opposite the bi-metal 50. An insulating point 92, of ceramic or the like, is carried by the screw 86 at its free end for contacting cooperation with the spring blade 54. For this purpose, the spring blade 54 is of somewhat greater length than the plate 56 to permit the screw 86 to move freely in a horizontal plane below the lower end of the blade 56 while effecting engagement with the lower end of the blade 54.

In Figure 4 of the drawing I have diagrammatically illustrated a typical electrical control circuit for effecting regulated energization of the heating element 18. The element 18 has been shown as a resistance coil connected by means of suitable conducting leads 96 and 98 to a source current. The contacts 62 and 64 serve to complete or interrupt the electrical circuit.

In practical operation, a cooking container 14 is positioned upon the top supporting surface of the base unit 12. The cup 40 of the thermostatic control unit 24 will be depressed downwardly by the cooking container 14, and contacting engagement will be maintained between the top wall 42 of the cup 40 and the center bottom wall portion of the container 14. The operator may then rotate the control knob 70 to a desired position indicated by suitable indicia on the name plate 72 corresponding to the proper cooking temperature required by the particular type of food within the container.

Assuming that the unit is "plugged in," current will be supplied to the heating element 18 for raising the temperature of the container 14 to effect a cooking operation. Selective rotation of the control knob 70 will have served to effect a predetermined positioning of the spring blade 54 relative to the spring blade 56. The spring bias of each of the blades 54 and 56 is selected so that the blade 56 will normally maintain contacting engagement of its contact 64 with contact 62 of blade 54 through the entire adjusting range of the control knob 70.

As the heating element 18 raises the temperature of the container 14, cooking will commence and heat will be transmitted from the food and the center portion of the container 14 to the top wall 42 of the cup 40. At the same time, the cup 40 will be substantially heat-insulated from the heating element 18 and the outer peripheral portions of the cooking container 14. In this way, the cup 40 will be raised in temperature proportionate to the temperature of the center portion of the container 14. This temperature closely corresponds to the temperature of the food within the container 14, substantially independent of the relatively higher temperatures of the peripheral portion of the container 14 and the annular heating element 18 therebelow.

The heat of the cup 40 will be transmitted to the bi-metal 50 resulting in a movement thereof. The arcuate form of the bi-metal element is selected so that with increasing temperature the actuator stud 52 will be moved through the aperture 58 in blade 54 toward the blade 56. When a predetermined high temperature has been reached, corresponding to the pre-selected cooking temperature of the control knob setting, the actuator stud 52 will effect engagement with the contact blade 56 and move it away from the cooperating contact blade 54 which is fixedly held in position by the insulating point 92 of the adjusting screw 86. When the temperature begins to drop below the control point, the bi-metal 50 will cool and move in an opposite direction to retract the stud 52, thereby permitting the normal spring bias of the blade 56 to again effect contact between the contacts 62 and 64. In this way, the current supply to the heating element will be alternately completed and discontinued about a predetermined control point for maintaining a pre-selected cooking temperature substantially in response to the temperature of the food being cooked.

Changes may be made in the construction and arrangement of the parts of my Thermostat for Multi-Purpose Cooker without departing from the real spirit and purpose of my invention, and it is my intention to cover by the claims any modified forms of structure or use of mechanical improvements which may be reasonably included within their scope.

What I claim as new and desire to obtain by Letters Patent of the United States is:

1. A cooking appliance comprising, in combination: base means defining a depressed recess and including annularly disposed heating means in said depressed recess for providing heat to a container positioned thereabove; a temperature-responsive control unit for said heating means disposed centrally of the annularly disposed heating means and being arranged for movement axially of said heating means; spring means normally biasing said movable temperature-responsive control unit upwardly to cause said control unit to engage a container positioned thereabove; said temperature-responsive control unit including a frame member having a heat-conductive portion thereof adapted to engage, under the bias of said spring means, a container positioned thereabove so that said heat-conductive portion will partake of the temperature of said container, and a thermostatic control for said heating means carried by and freely movable with said frame member under the bias of said spring means, and said thermostatic control including a thermally energizable actuator carried by the frame member and in conductive thermal communication with said heat-conductive portion of the frame member, and switch means carried by the frame member and insulated from said actuator and positioned to be actuated by said actuator; and manual control means for selectively controlling, from a remote position, the temperature at which said actuator will effect actuation of said switch means, said manual control means including a pair of substantially rigid control members carried one each by said base means and said frame member which is movable with respect to the base means, and there being a lost motion connected between said pair of control members to accommodate said relative movement which will occur between said frame member and said base means to which said control members are connected and an annular cup-shaped shield means surrounding said spring means and arranged to have the lower end of said spring means abut the annular bottom wall thereof, said shield means being positioned between said temperature-responsive control unit and said heating means to shield the former from the latter.

2. A device as set forth in claim 1 wherein one of said pair of control members is screw-threaded and has a non-circular connector head thereon, and the other of said pair of control members is rotatably mounted and has an elongated forked end for slidably engaging said non-circular head of said screw-threaded control member, to thereby provide the lost motion connection which accommodates movement of said frame member, and of the elements carried thereby, relative to the base means.

3. A cooking appliance comprising, in combination: base means defining a depressed recess and including annularly disposed heating means in said depressed recess for providing heat to a container positioned thereabove; a temperature-responsive control unit for said heating means disposed centrally of the annularly disposed heating means and being arranged for vertical movement axially of said heating means; spring means, which are located substantially between spaced horizontal planes which define upper and lower confines of said control unit, normally biasing said movable temperature-responsive control unit upwardly to cause said control unit to engage a container positioned thereabove; said temperature-responsive control unit including a frame member having a heat-conductive portion thereof adapted to engage, under the bias of said spring means, a container positioned thereabove so that said heat-conductive portion will partake of the temperature of said container, and a thermostatic control for said heating means carried by and freely movable with said frame member under the bias of said spring means, and said thermostatic control including a thermally energizable actuator carried by the frame member and in conductive thermal communication with said heat-conductive portion of the frame member, and switch means carried by the frame member and insulated from said actuator and positioned to be actuated by said actuator; and manual control means, located substantially in a single plane which is disposed below said spring means and said temperature-responsive control unit and which plane is transverse to the directions of vertical movement of said temperature-responsive control unit, for selectively controlling, from a remote position, the temperature at which said actuator will effect actuation of said switch means and for providing a vertically compact arrangement of vertically movable temperature-responsive unit and manual control therefor, said manual control including a pair of substantially rigid, elongated, control members each disposed substantially horizontal and being carried one each by said base means and by said frame member which is movable vertically with respect to said base means, and there being a lost motion connection between said pair of control members which maintains a driving connection therebetween while accommodating the relative vertical movement that will occur between said frame member and said base means which carry said pair of control members.

References Cited in the file of this patent

UNITED STATES PATENTS

| | | |
|---|---|---|
| 2,207,634 | Meyers | July 9, 1940 |
| 2,267,387 | Winborne | Dec. 23, 1941 |
| 2,288,510 | Brannon | June 30, 1942 |
| 2,306,979 | Potsdam | Dec. 29, 1942 |
| 2,387,460 | Myers | Oct. 23, 1945 |
| 2,430,715 | Grayson | Nov. 11, 1947 |
| 2,524,506 | Akeley | Oct. 3, 1950 |
| 2,678,379 | Fry | May 11, 1954 |
| 2,702,336 | Wagner et al. | Feb. 15, 1955 |
| 2,715,176 | Schoberle | Aug. 9, 1955 |
| 2,749,426 | Schwaneke | June 5, 1956 |
| 2,820,129 | Long et al. | Jan. 14, 1958 |